United States Patent Office 2,882,242
Patented Apr. 14, 1959

2,882,242
NEW CATALYST COMPOSITION

Charles W. Weber, Jersey City, N.J., assignor to The M. W. Kellogg Company, Jersey City, N.J., a corporation of Delaware No Drawing. Application October 30, 1953
Serial No. 389,485

15 Claims. (Cl. 252—437)

This invention relates to a new catalyst useful for various reactions, such as in the manufacture of an organic phosphonyl halide. In one of its more particular aspects, the invention relates to a new catalyst composition for use in the production of methane phosphonyl dichloride.

The organic phosphonyl halides and especially methane phosphonyl dichloride are much in demand as intermediate chemical reactants for the production of more complex organic phosphorus compounds, such as the corresponding esters, free acids and amides by conventional methods, which are useful as fungicides, insecticides, pharmaceuticals, petroleum additives to improve the stability and quality of lubricating oils, and polymer additives. The conventional method for producing the organic phosphonyl halides is illustrated by the following reactions:

(1)   $6CH_3OH + 2PCl_3 \rightarrow 2(CH_3O)_2POH + 2CH_3Cl$ (2) 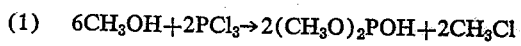

(3) 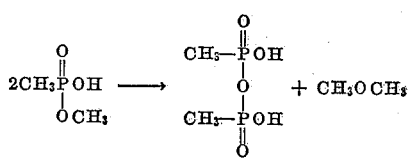

(4) 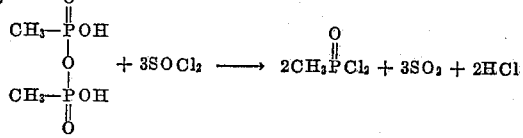

An object of this invention is to provide a new catalyst composition.

Still another object is to provide a new and improved catalyst composition for producing an organic phosphonyl halide.

Various other objects and advantages of the present invention will become apparent to those skilled in the art from the accompanying description and disclosure.

In accordance with this invention an organic phosphonyl halide having the general formula

where R is an organic radical, preferably an alicyclic or acyclic alkyl radical including the substituted radicals, such as an aralkyl radical or a halogen substituted acyclic or alicyclic alkyl radical, and X is any of the halogens (Br, Cl, I, F) and the X's may be the same or different halogen atoms, is produced by directly reacting a phosphorus halide, preferably a phosphorus trihalide, having halogens corresponding to the halogens of the desired product with an organic compound of the formula:

R—O—R' in which R is an organic radical and is the same as the R of the general formula for the organic phosphonyl halide and R' is a radical containing an organic group, in the presence of a catalyst mixture comprising iodine and a metal phosphorus trihalo complex. The organic phosphonyl halide produced may be recovered directly from the reaction mixture by conventional methods, such as distillation, or may be reacted with other compounds to form derivatives thereof and the derivative recovered.

The present catalyst composition is also useful in reacting an organic ether, an organic halide, such as methyl chloride, and a trivalent phosphorus halide to produce an organic phosphonyl halide, such as methane phosphonyl dichloride. This reaction is described more completely in my copending application Serial No. 389,483, filed concurrently with the present application. Other reactions which may be carried out in the presence of the catalyst composition of this invention are the reaction of olefins, e.g., 1-octene, with phosphorus trihalide, e.g., $PCl_3$, to produce a halo alkyl phosphorus dihalide, the reaction of an ether, e.g., tetrahydrofuran, with carbon monoxide to produce organo phosphorus halides, and the polymerization of olefins.

The phosphorus trihalo complex of the catalyst mixture includes any metal phosphorus trihalo complex of the general formula $M(PX_3)_n$ where X is chlorine, bromine, iodine or fluorine and M is a metal selected from groups VI and VIII of the periodic table, such as chromium, iron, cobalt, nickel, molybdenum, ruthenium, rhodium, tungsten, rhenium, osmium and iridium and "n" is a number equal to at least twice the minimum valence of the metal involved.

Examples of such phosphorus trihalo complexes are: cobalt tetrakistrichlorophosphine, iron penta-trichlorophosphine, nickel tetrakistribromophosphine, nickel tetrakistrifluorophosphine, cobalt tetrakistribromophosphine and osmium penta-trichlorophosphine.

The metal phosphorus trihalo complexes may be prepared in a manner similar to the following as illustrated for nickel tetrakistrichlorophosphine. Nickel carbonyl is reacted with excess phosphorus trichloride by heating on a steam bath under reflux conditions. Excess $PCl_3$ is removed by distillation. The remainder is dissolved in pentane and cooled to −60° C. in an atmosphere of carbon dioxide to precipitate the product.

It is within the scope of this invention to form the metal phosphorus trihalo complex in situ in the reaction zone by introducing the appropriate metal carbonyl with the reactants including phosphorus trihalide.

The use of the metal phosphorus trihalo complex materially reduces the amount of iodine required as a catalyst to obtain comparable yields of product. As a result the present process is cheaper with respect to both initial cost of catalyst and recovery and purification of product to free it from free iodine formed during the reaction.

Examples of suitable iodine-containing catalysts which may be used as the iodine component of the catalyst composition in accordance with this invention are: metal iodides, such as nickel iodide, zinc iodide, cobalt iodide, sodium iodide, aluminum iodide and manganese iodide; phosphorus iodides, such as phosphorus di-iodide and phosphorus tri-iodide; phosphonium iodides, such as trimethyl phosphonium di-iodide; alkyl iodides, such as methyl iodide; and free iodine.

Generally the total catalyst mixture is employed in an amount between about 0.001 mole to about 1 mole per mole of organic compound R—O—R', the preferable amount being between about 0.005 mole and about 0.5 mole per mole of R—O—R'. Usually no more than about 0.02 mole per mole of R—O—R' of the iodine component is required and it may be as low as a trace.

The mole ratio of the iodine component to the metal phosphorus trihalo complex of the catalyst is between about 1:100 and about 1:1, preferably 1:25 to 1:2.

In the use of this catalyst for the production of alkyl phosphonyl halides various phosphorus trihalides may be employed, such as phosphorus trifluoride, phosphorus trichloride, phosphorus tribromide, phosphorus triiodide and diphosphorus tetra-iodide; and the mixed halide phosphorus trihalides, such as fluoro phosphorus dichloride, difluoro phosphorus chloride, fluoro chloro phosphorus bromide, dichloro phosphorus iodide and dichloro phosphorus bromide. The particular phosphorus trihalide employed depends upon the ultimate product desired. When producing an organic phosphonyl dichloride, phosphorus trichloride is preferred.

The organic compounds of the formula R—O—R' to be reacted with the phosphorus halide for the first reaction mentioned hereinbefore include the ethers, esters, acetals and ketals and are preferably those compounds in which R is an alicyclic or acyclic alkyl radical having not more than eight carbon atoms and R' is an organic radical, preferably having a continuous carbon skeleton and not more than 8 carbon atoms, i. e., all carbon attached together, —C—C—C—. Mixtures of two or more different organic compounds (R—O—R') may be reacted with the phosphorus trihalide without departing from the scope of this invention. In case R or R' are halogen substituted radicals the halogens may be any of the group F, Cl, I and Br, however, chlorine and bromine are preferred.

The preferred organic ethers for use as reactant in the reactions mentioned are selected from the group consisting of the acyclic and alicyclic alkyl ethers including the substituted acyclic alkyl ethers, such as the halo, nitro, cyano and aryl substituted ethers. Examples of ethers are the simple symmetrical ethers, such as dimethyl ether, diethyl ether; dicyclohexyl ether; dibenzyl ether; beta, beta'-dichloro diethyl ether; and beta, beta'-oxy dipropionitrile. The simple unsymmetrical ethers may also be employed but, with the exception of the mono-alpha halogenated alkyl ethers, the unsymmetrical ethers lead to the formation of mixed products corresponding to the different alkyl or cycloalkyl radicals of the ether. Of such unsymmetrical ethers, examples are: methyl ethyl ether, methyl n-butyl ether, ethyl n-propyl ether, methyl t-butyl ether, cyclohexyl methyl ether, 2-nitropropyl methyl ether and methyl benzyl ether. The mono-alpha halogenated alkyl ethers having the general formula

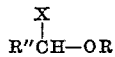

where

corresponds to the R' group of the general formula R—O—R', and R" is hydrogen or an alkyl radical and the R group is found in the final product, are particularly good substituted ethers which may be used; examples are chloromethyl methyl ether; bromomethyl ethyl ether, alpha-chloroethyl propyl ether and bromomethyl isoamyl ether. X of the above formula is a halogen (Cl, F, Br, I). Instead of using simple ethers containing only one ether linkage, poly ethers, such as polyoxymethylene, polyoxyethylene and polyoxypropylene alcohols may be employed in this invention.

Examples of the esters within the formula R—O—R' include the mono esters, the poly esters and the ortho esters. Preferred mono esters are: methyl formate, methyl acetate, butyl acetate, benzyl acetate and methyl propionate. Suitable ortho esters include trimethyl ortho formate, trimethyl ortho acetate, dimethyl cyclobutyl ortho acetate and trimethyl ortho benzoate. Examples of polyesters are: dimethyl oxalate, dimethyl phthalate and dimethyl adipate. Other esters include the poly-esters of inorganic acids, such as dimethyl carbonate, dimethyl sulfate, diethyl sulfate, trimethyl borate, tributyl borate and triethyl phosphate.

Similarly suitable acetals include dimethyl formal, diethyl formal, dimethyl acetal and diethyl benzal.

Examples of ketals for use in this invention are: dimethyl ketal of acetone and cyclohexanone.

A typical equation representing the first reaction in which the catalyst of this invention may be used is:

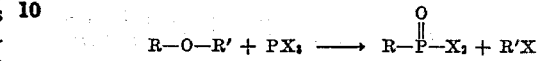

where R and R' are organic radicals and X is a halogen atom, as previously discussed. Both R and R' and X may be the same or different radicals or atoms of their respective groups. The reactions using the catalyst of this invention including the above reaction is carried out generally at a temperature above about room temperature (20° C.) and below the decomposition temperature of the reactants. Generally the temperature will be not higher than about 500° C. The reaction may be effected in either the liquid or vapor phase. The reaction is preferably carried out in the liquid phase and this is accomplished by employing sufficient pressure to maintain the reactants in liquid phase condition in the reaction zone at the temperature employed. Conveniently, the reaction is carried out under autogenous conditions of pressure. The preferred temperature for the above reaction for liquid phase operations at elevated pressures is between about 175° C. and about 275° C.

In the reactions for the production of organo phosphorus halides the ratio of phosphorus trihalide and organic reactant may be varied over relatively wide limits but it is preferable to employ between about equimolar amounts of both reactants and about a four fold molar excess of phosphorus trihalide reactant. Similarly, the time of reaction may vary over relatively wide limits, such as 10 minutes to 20 hours, the preferable time of reaction being between about one hour and about 15 hours.

Any of the reactions for producing organo phosphorus halides may be conducted as a multi-stage reaction, and preferably as a two-stage reaction. Conducting the reaction in such a stepwise manner consists of reacting in the first step of the reaction the phosphorus trihalide and the organic reactant in the presence of the catalyst comprising iodine, the second and subsequent steps then consist of treating the total crude product obtained in the first step with additional amounts of the same reactants used in the first step with or without the addition of more catalyst. In so conducting the reaction in this step-wise manner improved yields of organic phosphonyl halides are obtained by using smaller amounts of catalyst as compared to the amount of catalyst needed when the reaction is conducted as a one-stage reaction.

The reaction may also be carried out in batchwise or continuous systems without departing from the scope of this invention. The reaction may be effected in the presence of liquid diluents, such as chloroform, xylene, benzene, and cyclohexane, in which the reactants are dissolved, or dispersed by mechanical agitation or by conventional emulsifying agents.

The iodine which may be present upon completion of the reaction is conveniently removed by treating the crude product with mercury followed by removal of mercury iodide salts by filtration. The products of the reaction are further purified by conventional techniques, such as distillation or crystallization depending upon the physical nature of the products. The organic phosphonyl halides may be isolated as such or they may be hydrolyzed to the corresponding phosphonic acids which may then be converted to various ester derivatives, or the phosphonyl halides may be converted directly to a desired type ester by conventional methods. The products are identified by the usual methods, such as determination of boiling point and other such physical properties, determination of infrared absorption spectra, percent composition analysis, mass spectrometer analysis, etc.

It is to be understood that the choice of temperature of reaction, contact time, molar quantities of reactants and catalyst to be preferred in any instance will depend upon such factors as the starting materials employed and the product desired, and that the procedure for the isolation and purification of desired products will be dependent upon the physical nature of the products.

The following examples are offered as a better understanding of the present invention and of the reaction of phosphorus trichloride with various organic compounds to produce methane phosphonyl dichloride, but the examples are not to be considered as unnecessarily limiting to the present invention. Although the following examples describe the preparation of methane phosphonyl dichloride, other organic phosphonyl halides may be prepared similarly by the process of this invention, a few illustrative examples of which are: methane phosphonyl dibromide, cyclohexane phosphonyl dichloride, ethane phosphonyl dichloride, iso-propane phosphonyl dichloride, benzyl phosphonyl dichloride, ethane phosphonyl dibromide and 2-chloro ethane phosphonyl dichloride.

*Example 1*

A 200 ml. steel pressure bomb was charged with 78.5 ml. (0.9 mole) of phosphorus trichloride, 33.0 grams (0.72 mole) of dimethyl ether and 18.8 grams (0.06 mole) of cobalt iodide. The bomb was closed, placed in a reciprocating shaker, heated to 250° C. and held at this temperature for 7 hours. The bomb was then cooled and vented to atmospheric pressure. The total crude product in the bomb was transferred to a distillation flask and heated until no more liquid distilled. This liquid, which contained some iodine, was diluted with chloroform, shaken with mercury and filtered to remove the mercury iodide salts. After evaporation of the chloroform the residual liquid was subjected to distillation at elevated temperatures and atmospheric pressure to obtain an impure fraction boiling at 158° C. to 185° C. This fraction was found to contain a substantial amount of methane phosphonyl dichloride and a small amount of dimethyl phosphonyl chloride.

*Example 2*

A 200 ml. steel pressure bomb was charged with 78.5 ml. (0.9 mole) of phosphorus trichloride, 32.0 grams (0.69 mole) of dimethyl ether and 18.8 grams (0.06 mole) of nickel iodide. The procedure of Example 1 was repeated except that the reaction time at 250° C. was 4.8 hours. An impure fraction boiling at 160° C. to 190° C. was obtained. This fraction contained a substantial amount of methane phosphonyl dichloride.

*Example 3*

A 200 ml. steel presure bomb was charged with 0.68 mole of phosphorus trichloride, 0.68 mole (31.2 grams) of dimethyl ether, 0.056 mole of nickel tetrakistrichlorophosphine and 0.004 mole (1.36 grams) of nickel iodide. The bomb was then closed, placed in a reciprocating shaker, heated to 250° C. and held at this temperature for seven hours. The total crude product in the bomb was transferred to a distillation flask and heated at atmospheric pressure to obtain a liquid fraction boiling at 158° C. to 190° C. This fraction contained a substantial amount of methane phosphonyl dichloride and a small amount of dimethyl phosphonyl chloride. The amount of methane phosphonyl dichloride was substantially greater in yield than that obtained in either Examples 1 or 2.

Although the invention has been described with relation to specific reaction conditions and operating techniques, various modifications and alterations may become apparent to those skilled in the art without departing from the scope of this invention.

Having described my invention, I claim:

1. A catalyst composition consisting essentially of a mixture of (A) and (B) wherein (A) is selected from the group consisting of metal iodides, phosphorus iodides, lower alkyl iodides and free iodine, and wherein (B) is a metal inorganic phosphorus trihalo complex component having the formula $M(PX_3)_n$ in which M is a metal selected from the group consisting of group VI and group VIII metals, X is halogen and $n$ is a number equal to at least twice the minimum valence of M, in a mol ratio of said (A) to (B) of between about 1:100 and about 1:1.

2. The composition of claim 1 in which (A) of said catalyst composition is nickel iodide.

3. The composition of claim 1 in which (A) of said catalyst composition is zinc iodide.

4. The composition of claim 1 in which (A) of said catalyst composition is cobalt iodide.

5. The composition of claim 1 in which (A) of said catalyst composition is phosphorus tri-iodide.

6. The composition of claim 1 in which (A) of said catalyst composition is phosphorus di-iodide.

7. The composition of claim 1 in which the metal phosphorus trihalo complex of the catalyst composition is nickel tetrakistrichlorophosphine.

8. The composition of claim 1 in which the metal phosphorus trihalo complex of the catalyst composition is cobalt tetrakistrichlorophosphine.

9. The composition of claim 1 in which the metal phosphorus trihalo complex of the catalyst composition is nickel tetrakistribromophosphine.

10. The composition of claim 1 in which the metal phosphorus trihalo complex of the catalyst composition is nickel tetrakistrifluorophosphine.

11. The composition of claim 1 in which the metal phosphorus trihalo complex of the catalyst composition is iron pentatrichlorophosphine.

12. A catalyst composition consisting essentially of a mixture of a group VIII metal iodide and a metal inorganic phosphorus trihalo complex having the formula $M(PX_3)_n$ in which M is a group VIII metal, X is halogen, and $n$ is a number equal to at least twice the minimum valence of M, in a mol ratio of said metal iodide to said complex of between about 1:100 and about 1:1.

13. A catalyst composition consisting essentially of a mixture of (A) and (B) wherein (A) is selected from the group consisting of a metal iodide, a phosphorus iodide, a lower alkyl iodide and free iodine, and (B) is a metal inorganic phosphorus trihalo complex having the formula $M(PX_3)_n$ in which M is a metal selected from the group consisting of group VI and group VIII metals, X is halogen and $n$ is a number equal to at least twice the minimum valence of M, in a mole ratio of said (A) to (B) of between about 1:25 and about 1:2.

14. A catalyst composition consisting essentially of a mixture of nickel iodide and nickel tetrakistrichlorophosphine in a mole ratio of about 1:14.

15. A catalyst composition consisting essentially of a mixture of nickel iodide and nickel tetrakistrichlorophosphine in a mole ratio between about 1:25 and about 1:2.

References Cited in the file of this patent

UNITED STATES PATENTS

| | | |
|---|---|---|
| 2,376,264 | Martin | May 15, 1945 |
| 2,392,841 | Detrick et al. | Jan. 15, 1946 |
| 2,489,917 | Brown | Nov. 29, 1949 |
| 2,668,853 | Orwoll | Feb. 9, 1954 |
| 2,685,602 | Woodstock et al. | Aug. 3, 1954 |